Sept. 11, 1923.
G. A. LYON
1,467,389
AUTOMOBILE BRACE BAR BUFFER
Filed Oct. 7, 1922
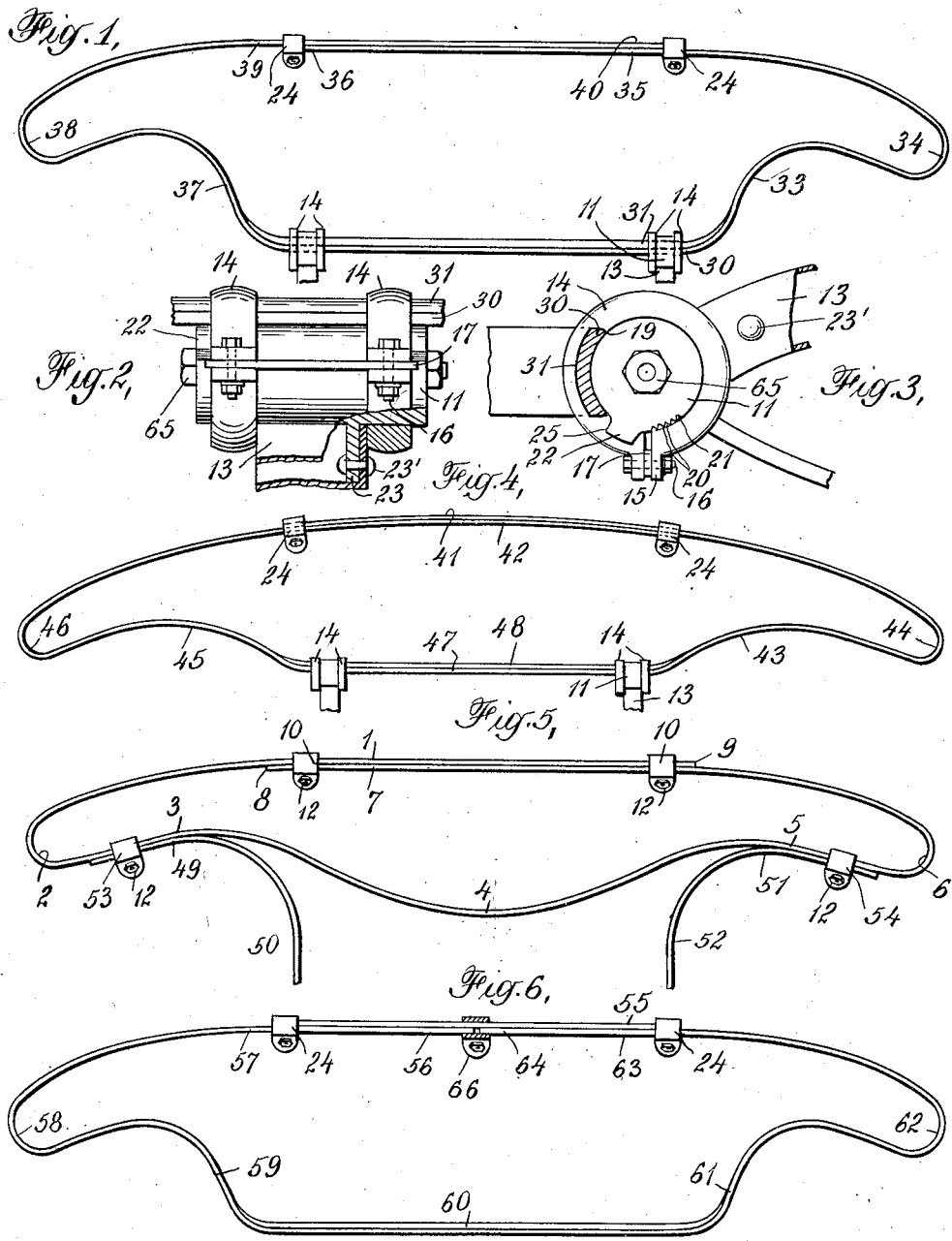

Patented Sept. 11, 1923.

1,467,389

UNITED STATES PATENT OFFICE.

GEORGE ALBERT LYON, OF PHILADELPHIA, PENNSYLVANIA.

AUTOMOBILE BRACE-BAR BUFFER.

Application filed October 7, 1922. Serial No. 592,941.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Brace-Bar Buffers, of which the following is a specification, taken in connection with the accompanying drawing.

This application is a partial continuation of my application Serial No. 349,420 originally filed January 5, 1920, and renewed January 20, 1922, as Serial No. 530,728; and my application Serial No. 351,284 originally filed January 14, 1920, and renewed January 26, 1922, as Serial No. 532,031, that is, this case contains subject matter taken therefrom.

This invention relates especially to automobile buffers with which may be combined brace bars or supporting members which may be connected to the automobile through spring strips or other attaching members or which may be more directly secured or connected to the automobile or other vehicle frame members in some cases to reenforce and strengthen them. For this purpose special frame ends which may be riveted or otherwise connected to the forward ends or portions of the usual channel section frame members of the vehicle may advantageously be provided with laterally extending supporting bosses on one or both sides of each frame member and an enclosing supporting clamp may cooperate with each boss which, if desired, may be recessed to receive and align the brace bar portion. The supporting boss may, if desired, have retainer lugs or portions and aligning faces to engage and align the supporting clamp which may enclose the boss and cooperating brace bar or other supporting portions of the buffer so that the brace bar portions may thus be securely clamped or connected to each of the frame members so as to have a desirable reenforcing action thereon and at the same time support the buffer front of any suitable construction which may be in the same plane or bent upwards in some cases so as to be arranged in a higher plane than the connected rear supporting portions. The brace bar or supporting portions may, if desired, have integrally or otherwise connected end loops and adjacent inturned connector portions to which may be detachably or otherwise connected the buffer front portions preferably formed of spring strip or other resilient elements and having, if desired, vertically wide or separated portions or strips to give increased contact area especially adjacent the middle of the buffer front, so that these impact receiving members may have the desired resilient action under collision conditions. It is sometimes desirable to form the brace bar or supporting portion of the buffer of one or more pieces of resilient spring steel strip each of which may have integral end loop portions extending out into protective position in front of the vehicle wheels and also inturned impact receiving or buffer front portions which may overlap or cooperate to form multiple strip reenforced portions adjacent the central part of the buffer front.

In the accompanying drawing showing in a somewhat diagrammatic way various illustrative embodiments of this invention:

Fig. 1 is a plan view partly in section showing an illustrative buffer.

Fig. 2 is an enlarged bottom view showing the frame end connection.

Fig. 3 is a similar side view; and

Figs. 4, 5 and 6 are plan views showing other illustrative forms of buffers.

In the illustrative embodiment of the invention shown in Fig. 1 the brace bar or rear transverse supporting portion of the buffer may comprise one or more strips of spring steel or other suitable resilient material which is preferably formed with integrally extending end loops and buffer front strips or portions which may be arranged to form a double strip reenforced buffer front. As shown in Fig. 1 the entire device may in some cases be formed of a single strip of resilient material which may have a brace bar portion 30 formed, if desired, with a forwardly projecting or convex section portion 31 which may die out gradually on each side so as to give the desired degree of resilient yield to the forwardly and outwardly curving portions 33, 37 and the connected end loops 34, 38. The integrally connected impact receiving portions 35, 39 may be of such length that their ends 36, 40 overlap to a considerable extent to give a reenforced buffer front when these ends are connected in any suitable way as by enclosing clips or clamps 24.

The brace bar or supporting portion of the buffer may, if desired, be connected directly to the automobile frame members which may in such cases be advantageously formed with special supporting bosses or frame ends adapted to cooperate with these parts of the buffer. As shown in Figs. 2 and 3 the channel section frame members 13 may have securely connected thereto in any desired way the supporting bosses 11 of malleable cast iron or the like which may have an integral supporting member 23 to be secured within the end of the cooperating frame member as by the rivets 23'. These bosses or frame ends may be connected to the ends of the usual springs as by the spring bolts 65. These supporting bosses which may project on one or both sides of the frame member are preferably given such shape as to properly cooperate with the style of brace bar portion of the buffer which is used and as shown these supporting bosses may be substantially cylindrical where the forwardly curved or convex brace bar sections such as 30, 31 are employed. One or more supporting clamps, such as 14, may be used to secure these brace bar portions to the frame member and if desired these supporting clamps may be formed with suitable recesses, the edges 19 of which may closely engage or cooperate with the edges of the cooperating brace bar portions of the buffer so as to prevent undesirable angular movement at this point and by tightening this supporting clamp as by screwing up the tightening bolt 16 connecting its ends 15 the desired security of connection may be effected between these parts. This arrangement also makes it possible to angularly adjust the position of the brace bar and impact receiving portions of the buffer by moving the supporting clamp into the desired angular position around its supporting boss and suitable locking devices may be used to definitely hold the parts in such desired adjusted position. For this purpose notches such as 21 may be formed in the supporting boss 11 perferably adjacent its lower portion and one or more locking projections 20 may be formed on one or more of the suporting clamps preferably adjacent their ends 15 and may engage these notches so that when the clamp is tightened no further substantial angular movement is possible between these parts. For some purposes it is also desirable to have suitable retaining devices to prevent the lateral disengagement of the clamps and bosses and for this purpose one or more retainer lugs such as 22, may be formed on the bosses outside of the clamps and where they have even a slight projection, considerably less than is diagrammatically indicated, the interlocking action thus secured positively prevents accidental disengagement of the parts. Such retainer lugs may advantageously be formed with detent portions 25 in such position as to positively support the edges of the brace bar portions of the buffer and prevent any undesirable or excessive downward movement thereof with respect to the supporting bosses and frame members. Thus when such detents are employed there is no possibility of the buffer swinging down to such an extent as to interfere with the wheels or other parts of the vehicle. Another retaining device, which may be used instead of or in addition to the retainer lugs described, is a retainer bar such as 17 of any suitable material which may have a series of holes or apertures to be engaged by tightening bolts 16 so that in this way lateral movement of the supporting clamps is positively prevented after the tightening has taken place. In this way the supporting clamps not only securely and rigidly connect the buffer front to the frame members of the automobile or other vehicle, but also so tightly secure the brace bar portions of the buffer to the frame members that a very considerable and desirable reenforcing and bracing action is thus secured correspondingly strengthening the ends of the frame members against lateral bending or breaking. This form of construction also secures a considerable range of lateral adjustment so that the buffer and brace bar are thus of adjustable width to fit automobiles having different width frames which is of course a considerable advantage.

If desired, the integral strip buffer may have the form shown in Fig. 4 in which the forward or initial impact receiving portion of the buffer is forwardly arched and comprises the overlapping or reenforcing strip ends 41, 42 frictionally held together by the enclosing clamps 24. The end loops 44, 46 may extend out adjacent the automobile wheels and be given such shape as to allow the desired initial yield of this buffer front portion which finally engages the bent resilient portions between the end loops and the parts 43, 45 to give still further cushioning resistance to the subsequent yield of the buffer front. The rear transverse brace bar or supporting portion 47 may be slightly forwardly arched in cross section so as to have the convex stiffening portion 48 if desired, and this supporting portion is preferably spaced away from the cooperating part of the buffer front three or four times as much as the diameter of the end loops. This supporting portion may be supported in any desired way from the automobile as by the clamps 14 connecting it to special frame ends or supporting bosses 11 as previously described.

The buffer shown in Fig. 5 may be formed of similar tempered spring steel strip which may be a quarter or three-eighths of an inch thick and two inches or so wide and the buffer front may be formed of a single strip of spring steel bent to form the end loops 2 and 6 which are adapted to extend into protective position adjacent the wheels of the automobile or other vehicle while the ends of this spring strip may be carried inward so as to form overlapping reenforcing strips or portions 1, 7 throughout a considerable extent of the central part of this initial impact or forward member of the buffer front. If desired, the ends 8, 9 of this resilient strip may as indicated extend out somewhat beyond the attaching members 50, 52 of any suitable form which may be clamped or connected to the rear supporting portion of the buffer in any suitable way and which are adapted to be clamped or secured to the automobile frame so that throughout the distance between the automobile frame members this initial impact forward member of the buffer front may have such reenforced overlapping construction. These overlapping strips may be finished by grinding the front strip to or past the central part of the buffer front, and then throwing or springing this ground strip behind the other which can then be ground throughout its front face to give a smooth and finished appearance to the buffer front. These resilient strips may then be clamped or secured together in any suitable way and as indicated the enclosing clamping devices or clips 10, may be employed for this purpose and secured together by bolts 12 which may be arranged in rearwardly inclined position at the lower portions of these clamping devices as shown in Fig. 5 of the drawing and described in connection with the Lyon Patent 1,198,246, of September 12, 1916. The duplex buffer front is preferably formed with connecting portions 3, 5 which may be substantially straight for some distance inside the end loops and the cooperating connecting portions such as 49, 51 of the attaching members may be clamped or secured thereto by similar clamping devices 53, 54 when the bolts 12 are tightened. It is sometimes advantageous to form duplex buffer front elements of this general character with end loops which are spaced fairly closely together so that they are not separated by more than three or four inches or so, while at the central portion of the duplex buffer front the forward and rear members may be separated by a considerably greater distance as by bending rearwardly the auxiliary rear or supporting portion 4 adjacent its central portion so that six to ten inches or more separation may thus be secured between the forward and rear members at this part of the buffer front. Under collision conditions where the impact occurs adjacent the central part of the buffer front the forward initial impact member is bent as it resiliently resists the impact and especially where this forward member has such a doubled reenforced construction as indicated in Fig. 1 the end loops 2 and 6 tend to close so that after the central part of the forward member has been forced back these end loops are closed together sufficiently so that preliminary contact frequently occurs between the forward and rear members between the end loops and the central portion of the duplex buffer front.

Fig. 6 shows still another illustrative buffer in which the brace bar or supporting portion 60 may if desired be stiffened by being cupped or bent in cross section throughout this rear transverse portion of the buffer which may be connected to the frame or other members of the automobile and, if desired, this curved stiffened portion may die out at about the points 59, 61 so as to render more resilient the adjacent curved portions and end loops 58, 62. The connected front and impact receiving portions 57, 63 which are thus spaced amply away from the brace bar portion may extend to or adjacent each other and be connected together in any suitable way preferably in connection with one or more reenforcing front members or connecting members of suitable character such as the resilient front strip 55 so as to give increased resistance and cushioning action in absorbing impacts. If desired, suitable clamping devices such as 24 may connect these front portions and may enclose the front strips adjacent the ends of the reenforcing strip 55. It is also desirable in some cases to have an additional center clamp such as 66 which may enclose the ends 56, 64 of the front strips when they are substantially in line and thus hold them securely and rigidly against the cooperating portions of the reenforcing front strip.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

I claim:

1. The spring strip automobile buffer comprising a buffer front formed of a single strip having a rear stiffened supporting portion at least as wide as the distance between the automobile frame members and having end loops and forwardly arched impact receiving members extending over each other to form a double strip initial impact portion of the buffer front at least as wide as the distance between the automobile frame members and spaced at least considerably further away from the rear supporting portion than the diameter of the end loops and spring strip attaching members adapted to be connected to an automobile and adjustably connected to the rear portion of the buffer front.

2. The spring steel strip automobile buffer comprising a buffer front formed of a single strip having a rear supporting portion at least as wide as the distance between the automobile frame members and having end loops and impact receiving members extending across each other to form a double strip initial impact portion of the buffer front at least as wide as the distance between the automobile frame members and spaced at least twice as far away from the rear supporting portion as the diameter of the end loops.

3. The spring steel strip automobile buffer front comprising a single strip having a rear transverse portion and having end loops and forwardly bent inturned impact receiving members and connecting devices to form a multiple strip initial impact portion of the buffer front at least as wide as the distance between the automobile frame members and spaced considerably away from the rear supporting portion and spring strip attaching members adapted to be connected to an automobile and adjustably connected to the rear portion of the buffer front.

4. The spring steel strip automobile buffer front comprising a single strip having a rear transverse portion and having end loops and inturned impact receiving members and connecting devices to form a multiple strip initial impact portion of the buffer front and spring strip attaching members adapted to be connected to an automobile and adjustably connected to the rear portion of the buffer front.

5. The spring steel strip automobile buffer front comprising a single strip having a rear transverse portion and having end loops and inturned impact receiving members and connecting devices to form a multiple strip initial impact portion of the buffer front and attaching members adapted to be connected to an automobile and connected to the rear portion of the buffer front.

6. The steel strip automobile buffer front comprising a single strip having a substantially straight rear supporting portion and having end loops and inturned impact receiving members extending substantially into contact with each other and cooperating connecting devices to form a multiple strip initial impact portion of the buffer front at least as wide as the distance between the automobile frame member and steel strip attaching members adapted to be connected to an automobile and to the rear portion of the buffer front.

7. The steel strip automobile buffer front comprising a single strip having a rear supporting portion and having end loops and inturned impact receiving members extending substantially into contact with each other and cooperating connecting devices to form a multiple strip initial impact portion of the buffer front at least as wide as the distance between the automobile frame member.

8. The steel strip automobile buffer front formed of a single strip having a rear supporting portion at least as wide as the distance betwen the automobile frame members and having end loops and forwardly arched impact receiving members extending across in contact with each other to form a reenforced central initial impact portion of the buffer front spaced at least twice as far away from the rear supporting portion as the diameter of the end loops.

9. The steel strip automobile buffer front formed of a single strip having a rear supporting portion and having end loops and impact receiving members extending across in contact with each other to form a reenforced central initial impact portion of the buffer front.

10. The automobile buffer front formed of a single strip of tempered flat spring steel having looped ends adapted to extend into protective position adjacent the automobile wheels and having forwardly arched overlapping impact receiving portions frictionally clamped together to stiffen and strengthen this forward initial impact portion of the buffer front and having a rear transverse supporting portion of bent stiffened cross-section spaced at least twice as far away from the buffer front portion as the diameter of the end loops.

11. The automobile buffer front formed of a single strip of steel having looped ends adapted to extend into protective position adjacent the automobile wheels and having forwardly arched overlapping impact receiving portions frictionally clamped together to stiffen and strengthen this forward initial impact portion of the buffer front and having a rear transverse supporting portion.

12. The automobile buffer comprising a rear supporting member of steel strip having integrally connected end loops and front impact receiving portions extending over each other into mutually reenforcing position and cooperating clamping devices to connect and reenforce said front impact receiving portions.

GEORGE ALBERT LYON.